(12) United States Patent
Sandberg

(10) Patent No.: US 11,627,497 B2
(45) Date of Patent: Apr. 11, 2023

(54) FRONT-HAUL RATE REDUCTION FOR USE IN A CENTRALIZED RADIO ACCESS NETWORK

(71) Applicant: CommScope Technologies LLC, Hickory, NC (US)

(72) Inventor: Stuart D. Sandberg, Acton, MA (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/559,228

(22) Filed: Sep. 3, 2019

(65) Prior Publication Data
US 2020/0077304 A1 Mar. 5, 2020

Related U.S. Application Data

(60) Provisional application No. 62/726,882, filed on Sep. 4, 2018.

(51) Int. Cl.
*H04W 28/22* (2009.01)
*H04B 1/66* (2006.01)
(Continued)

(52) U.S. Cl.
CPC ............ *H04W 28/22* (2013.01); *H04B 1/662* (2013.01); *H04W 28/0257* (2013.01);
(Continued)

(58) Field of Classification Search
CPC ..... H04B 1/662; H04B 14/046; H04L 1/0003; H04W 28/0257; H04W 28/10; H04W 28/22; H03C 2200/0058
See application file for complete search history.

(56) References Cited

U.S. PATENT DOCUMENTS 6,711,144 B1  3/2004  Kim et al.
6,731,618 B1  5/2004  Chung et al.
(Continued)

FOREIGN PATENT DOCUMENTS

CN  102340823 A  2/2012
CN  106797641 A  5/2017
(Continued)

OTHER PUBLICATIONS

International Searching Authority, "International Search Report and Written Opinion from PCT Application No. PCT/US2019/049354", from Foreign Counterpart to U.S. Appl. No. 16/559,228, dated Dec. 20, 2019, pp. 1-8, Published: WO.

(Continued)

*Primary Examiner* — Elton Williams
(74) *Attorney, Agent, or Firm* — Fogg & Powers LLC

(57) ABSTRACT

One embodiment is directed to a method of using variable-resolution quantization to front-haul at least some data over a front-haul network in a system configured to provide wireless service to user equipment. The method comprises, for each symbol position, determining a respective number of required resource blocks having respective actual user-equipment (UE) signal data to front-haul for each carrier and determining the number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution. The method further comprises, for each symbol position, allocating the high-resolution resource blocks to each carrier and determining, for each carrier, which of the required resource blocks to quantize at the higher resolution. Other embodiments are disclosed.

30 Claims, 4 Drawing Sheets

(51) Int. Cl.
*H04W 28/10* (2009.01)
*H04W 28/02* (2009.01)
*H04W 72/04* (2009.01)
*H04W 28/08* (2009.01)
*H04L 1/00* (2006.01)

(52) U.S. Cl.
CPC ......... *H04W 28/085* (2013.01); *H04W 28/10* (2013.01); *H04W 72/0493* (2013.01); *H04L 1/0003* (2013.01)

(56) References Cited

U.S. PATENT DOCUMENTS

| | | | |
|---|---|---|---|
| 6,741,862 B2 | 5/2004 | Chung et al. |
| 6,781,999 B2 | 8/2004 | Eyuboglu et al. |
| 6,985,451 B1 | 1/2006 | Nattiv et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,566 B2 | 2/2013 | Gao et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 8,958,809 B2 | 2/2015 | Nama et al. |
| 8,982,841 B2 | 3/2015 | Srinivasan |
| 9,042,462 B2 * | 5/2015 | Hanson ................ H04B 14/066 375/247 |
| 9,078,284 B2 | 7/2015 | Richardson |
| 9,380,466 B2 | 6/2016 | Eyuboglu et al. |
| 9,998,310 B2 | 6/2018 | Barbieri et al. |
| 10,064,072 B2 | 8/2018 | Eyuboglu et al. |
| 10,064,242 B2 | 8/2018 | Pawar et al. |
| 10,097,391 B2 | 10/2018 | Fertonani et al. |
| 10,142,858 B2 | 11/2018 | Eyuboglu et al. |
| 10,313,917 B2 | 6/2019 | Halabian et al. |
| 10,355,895 B2 | 7/2019 | Barbieri et al. |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2004/0136373 A1 | 7/2004 | Bareis |
| 2004/0143442 A1 | 7/2004 | Knight |
| 2004/0146072 A1 | 7/2004 | Farmwald |
| 2004/0224637 A1 | 11/2004 | Silva et al. |
| 2005/0025160 A1 | 2/2005 | Meier et al. |
| 2005/0073964 A1 | 4/2005 | Schmidt et al. |
| 2005/0157675 A1 | 7/2005 | Feder et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0023419 A1 | 2/2007 | Ptasienski et al. |
| 2007/0058683 A1 | 3/2007 | Futami et al. |
| 2007/0086487 A1 | 4/2007 | Yasuda et al. |
| 2007/0140218 A1 | 6/2007 | Nair et al. |
| 2007/0153731 A1 * | 7/2007 | Fine ...................... H04B 17/24 370/329 |
| 2007/0207838 A1 | 9/2007 | Kuwahara et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2008/0200202 A1 | 8/2008 | Montojo et al. |
| 2008/0233886 A1 | 9/2008 | Kaminski et al. |
| 2008/0240034 A1 | 10/2008 | Gollamudi |
| 2009/0097444 A1 | 4/2009 | Lohr et al. |

(56) References Cited

U.S. PATENT DOCUMENTS

| | | |
|---|---|---|
| 2009/0135718 A1 | 5/2009 | Yeo et al. |
| 2009/0180423 A1 | 7/2009 | Kroener |
| 2009/0180435 A1 | 7/2009 | Sarkar |
| 2009/0265599 A1 | 10/2009 | Chae et al. |
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0316626 A1 | 12/2009 | Lee et al. |
| 2009/0327829 A1 | 12/2009 | Yang et al. |
| 2010/0011269 A1 | 1/2010 | Budianu et al. |
| 2010/0011271 A1 | 1/2010 | Giancola et al. |
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0115367 A1 | 5/2010 | Hsu |
| 2010/0118777 A1 | 5/2010 | Yamada et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0134862 A1 | 6/2011 | Huang et al. |
| 2011/0145672 A1 | 6/2011 | Jongren et al. |
| 2011/0170517 A1 | 7/2011 | Bakker et al. |
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0268007 A1 | 11/2011 | Barany et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0207206 A1 | 8/2012 | Samardzija et al. |
| 2012/0208581 A1 | 8/2012 | Ishida et al. |
| 2012/0213109 A1 | 8/2012 | Xu et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Bajj et al. |
| 2012/0300635 A1 | 11/2012 | Jersenius et al. |
| 2012/0300766 A1 | 11/2012 | Chen et al. |
| 2013/0016686 A1 | 1/2013 | Li et al. |
| 2013/0034197 A1 | 2/2013 | Aweya et al. |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0194985 A1 | 8/2013 | Letterman et al. |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0279452 A1 | 10/2013 | Liu |
| 2013/0294403 A1 | 11/2013 | Srinivasan |
| 2014/0003389 A1 | 1/2014 | Wang et al. |
| 2014/0031036 A1 | 1/2014 | Koo et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0126438 A1 | 5/2014 | Zhu et al. |
| 2014/0161070 A1 | 6/2014 | Chang et al. |
| 2014/0162664 A1 | 6/2014 | Stapleton et al. |
| 2014/0177549 A1 | 6/2014 | Knisely |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2015/0011219 A1 | 1/2015 | Saily et al. |
| 2015/0085720 A1 | 3/2015 | Gaal et al. |
| 2015/0117470 A1 | 4/2015 | Ryan et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1 | 10/2015 | Yang et al. |
| 2016/0037550 A1 | 2/2016 | Barabell et al. |
| 2016/0044548 A1 | 2/2016 | Choi et al. |
| 2016/0302088 A1 | 10/2016 | Eyuboglu et al. |
| 2016/0345342 A1 | 11/2016 | Eyuboglu et al. |
| 2017/0135121 A1 | 5/2017 | Eyuboglu et al. |
| 2017/0163330 A1 | 6/2017 | Raleigh et al. |
| 2017/0373890 A1 | 12/2017 | Fertonani et al. |
| 2018/0076914 A1 | 3/2018 | Zhou et al. |
| 2018/0287696 A1 | 10/2018 | Barbieri et al. |
| 2019/0007246 A1 | 1/2019 | Fertonani et al. |
| 2019/0116568 A1 | 4/2019 | Fertonani et al. |
| 2019/0208575 A1 | 7/2019 | Barbieri et al. |
| 2020/0235788 A1 | 7/2020 | Rajagopal et al. |

FOREIGN PATENT DOCUMENTS

| | | |
|---|---|---|
| EP | 1134935 A2 | 9/2001 |
| EP | 2352264 A1 | 8/2011 |
| EP | 2787646 A1 | 10/2014 |
| EP | 3269118 A2 | 1/2018 |
| JP | 2011103517 A | 5/2011 |
| KR | 20170028984 A | 3/2017 |
| WO | 2014076004 A2 | 5/2014 |
| WO | 2014124160 A2 | 8/2014 |
| WO | 2015191530 A2 | 12/2015 |
| WO | 2015197104 A1 | 12/2015 |
| WO | 2016145371 A2 | 9/2016 |
| WO | 2017070635 A1 | 4/2017 |
| WO | 2017100096 A1 | 6/2017 |
| WO | 2017152982 A1 | 9/2017 |
| WO | 2018017468 A1 | 1/2018 |

OTHER PUBLICATIONS

"3rd Generation Partnership Project Techinical Specification Group Radio Access Network Evolved Universal Terrestrial Radio Access (E-UTRA) Requirement for Support of Radio Resource Management (Release 8), 3GPP TS 36.133 V8.1.0", Mar. 2008, pp. 25 Publisher: 3GPP.

"3rd Generation Partnership Project; Technical Specification Group Radio Access Network; Evolved Universal Terrestrial Radio Access (E-UTRA); Base Station (BS) radio transmission and reception (Release 8)", "3GPP TS 36.104 V8.0.0", Dec. 2007, pp. 147.

"Small Cell Virtualization Functional Splits and Use Cases 159.05.1.01", "www.smallcellforum.org", Jun. 2015, pp. 58 Publisher: Small Cell Forum.

Belhouchet et al., "ITU/BDT Arab Regional Workshop on '4G Wireless Systems' LTE Technology: Session 3: LTE Overview-Design Targets and Multiple Access Technologies", "Tunisia", Jan. 27-29, 2010, pp. 1-82.

Dotsch et al., "Quantitative Analysis of Split Base Station Processing and Determination of Advantageous Architectures for LTE", "Published online: Wiley Online Library (wileyonlinelibrary.com)", 2013, pp. 105-128, Publisher: Bell Labs Technical Journal 18(1).

Garner, Geoffrey M., "IEEE 1588 Version 2", Sep. 24, 2008, pp. 89.

Haberland, Bernd et al., "Base Stations in the Cloud", "alcatel-lucent.com", Sep. 28, 2012, pp. 1-23, Publisher: Alcatel-Lucent.

Ma et al., "Radiostar: Providing Wireless Coverage Over Gigabit Ethernet", "Bell Labs Technical Journal; Published online in Wiley InterScience (www.interscience.wiley.com)", 2009, pp. 7-24, Publisher: Alcatel-Lucent.

Zhu, Zhenbo et al., "Virtual Base Station Pool: Towards a Wireless Network Cloud for Radio Access Networks", May 3, 2011, pp. 1-10, Publisher: IBM Research, Published in: Yorktown Heights, US.

(56) References Cited

OTHER PUBLICATIONS

International Bureau, "International Preliminary Report on Patentability from PCT Application No. PCT/US2019/049354", from Foreign Counterpart to U.S. Appl. No. 16/559,228, filed Mar. 18, 2021, pp. 1 through 5, Published: WO.

European Patent Office, "Extended European Search Report from U.S. Appl. No. 16/559,228, filed Apr. 2, 2022", from Foreign Counterpart to U.S. Appl. No. 16/559,228, filed Apr. 2, 2022, pp. 1 through 10, Published: EP.

Li et al., "SINR-Oriented Flexible Quantization Bits for Optical-Wireless Deep Converged eCPRI", 2018 International Conference on Optical Network Design and Modeling (ODNM), IFIP, May 14, 2018, pp. 172 through 177.

European Patent Office, "Extended European Search Report (Corrected) from U.S. Appl. No. 16/599,228, filed May 4, 2022", from Foreign Counterpart to U.S. Appl. No. 16/599,228, filed May 4, 2022, pp. 1 through 7, Published: EP.

\* cited by examiner

FRONT-HAUL RATE REDUCTION FOR USE IN A CENTRALIZED RADIO ACCESS NETWORK

CROSS-REFERENCE TO RELATED APPLICATIONS

This application claims the benefit of U.S. Provisional Patent Application Ser. No. 62/726,882, filed on Sep. 4, 2018, which is hereby incorporated herein by reference in its entirety.

BACKGROUND

A centralized radio access network (C-RAN) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each controller is coupled to the radio points over front-haul communication links or a front-haul network.

Typically, each radio point is associated with a single baseband unit and supports a single carrier provided by a wireless operator. If more than a single carrier's worth of capacity needs to be provided in a given coverage area or if multiple carriers are needed to provide service within a given coverage area, multiple remotes units would typically be deployed within the same coverage area.

SUMMARY

One embodiment is directed to a system to provide wireless service to user equipment. The system comprises one or more controllers communicatively coupled to a core network and a plurality of radio points to wirelessly transmit and receive radio frequency signals to and from the user equipment using one or more carriers and one or more air interfaces. Each of the radio points is associated with at least one antenna and located remote from the controller. Each of the plurality of radio points is communicatively coupled to the one or more controllers via a front-haul network. Each controller is configured to perform at least some Layer-3, Layer-2, and Layer-1 processing for at least one of the air interfaces. The system is configured to use variable resolution quantization to front-haul at least some data over the front-haul network by doing the following, for each symbol position: determine a respective number of required resource blocks having respective actual user-equipment (UE) signal data to front-haul for each carrier; determine a number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution; allocate the high-resolution resource blocks to each carrier; determine, for each carrier, which of the required resource blocks to quantize at the higher resolution; quantize each of the required resource blocks using either the higher resolution or the lower resolution depending on whether it was determined to quantize that required resource block at the higher resolution or not; and front-haul the quantized required resource blocks over the front-haul network.

Another embodiment is directed to a method of using variable resolution quantization to front-haul at least some data over a front-haul network in a system configured to provide wireless service to user equipment. The system comprises one or more controllers communicatively coupled to a core network and a plurality of radio points to wirelessly transmit and receive radio frequency signals to and from the user equipment using one or more carriers and one or more air interfaces. Each of the radio points is associated with at least one antenna and located remote from the controller. Each of the plurality of radio points is communicatively coupled to the one or more controllers via a front-haul network. Each controller is configured to perform at least some Layer-3, Layer-2, and Layer-1 processing for at least one of the air interfaces. The method comprises, for each symbol position front-hauled over the front-haul network: determining a respective number of required resource blocks having respective actual user-equipment (UE) signal data to front-haul for each carrier; determining a number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution; allocating the high-resolution resource blocks to each carrier; determining, for each carrier, which of the required resource blocks to quantize at the higher resolution; quantizing each of the required resource blocks using either the higher resolution or the lower resolution depending on whether it was determined to quantize that required resource block at the higher resolution or not; and front-hauling the quantized required resource blocks over the front-haul network.

Another embodiment is directed to a multi-carrier radio point for use in a system to provide wireless service to user equipment. The system comprises one or more controllers communicatively coupled to a core network and a plurality of radio points including the multi-carrier radio point. Each controller is configured to perform at least some Layer-3, Layer-2, and Layer-1 processing for at least one of the air interfaces. The multi-carrier radio point comprises at least one interface to communicatively couple the multi-carrier radio point to a front-haul network used for front-hauling data between the controllers and the multi-carrier radio point. The multi-carrier radio point further comprises at least one programmable device and at least one radio frequency module configured to wirelessly transmit and receive radio frequency signals to and from the user equipment using one or more carriers and one or more air interfaces. The at least one programmable device is configured to use variable resolution quantization to front-haul at least some data over the front-haul network by doing the following, for each symbol position front-hauled over the front-haul network: determine a respective number of required resource blocks having respective actual user-equipment (UE) signal data to front-haul for each carrier; determine a number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution; allocate the high-resolution resource blocks to each carrier; determine, for each carrier, which of the required resource blocks to quantize at the higher resolution; quantize each of the required resource blocks using either the higher resolution or the lower resolution depending on whether it was determined to quantize that required resource block at the higher resolution or not; and front-haul the quantized required resource blocks over the front-haul network.

Other embodiments are disclosed.

The details of various embodiments are set forth in the accompanying drawings and the description below. Other features and advantages will become apparent from the description, the drawings, and the claims.

DRAWINGS

Figure 3:
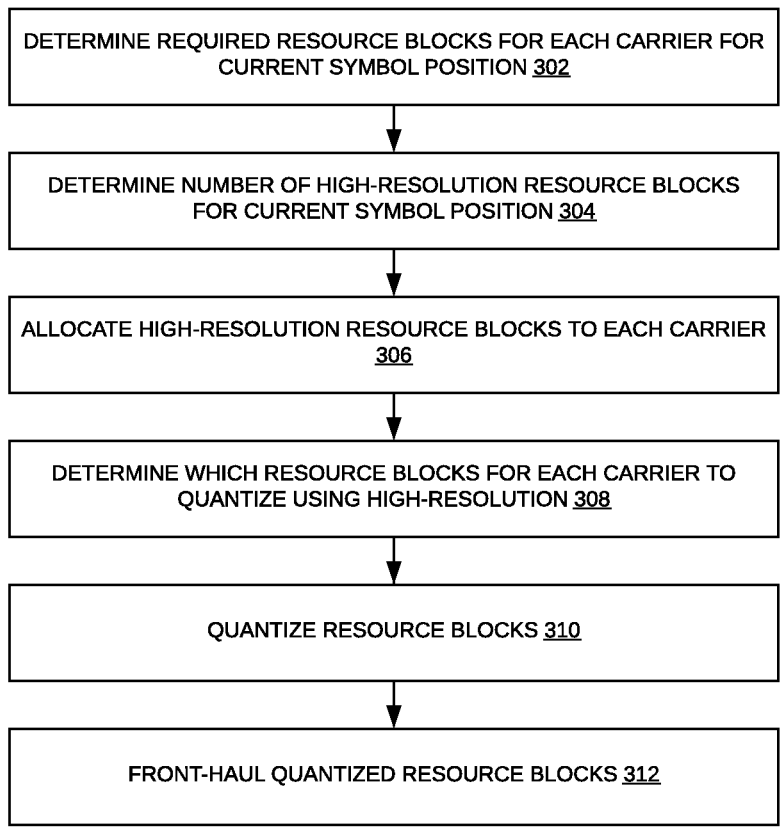

FIG. 3 comprises a high-level flowchart illustrating one exemplary embodiment of a method of using variable resolution quantization to front-haul at least some IQ data in a C-RAN.

Figure 4:
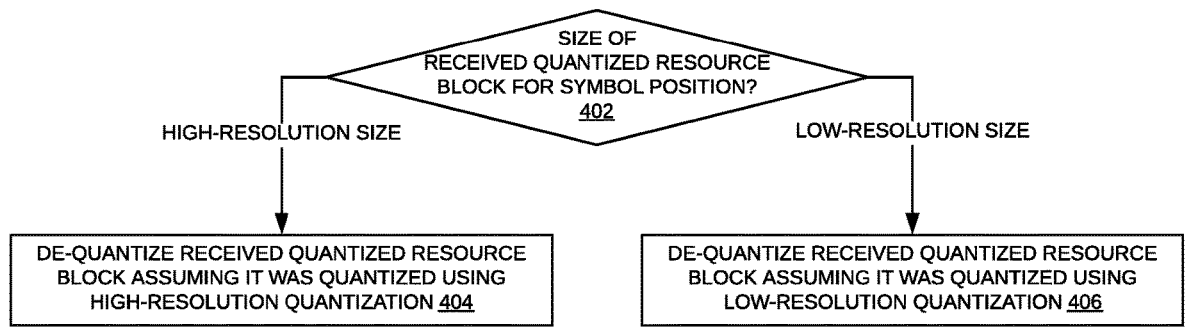

FIG. 4 comprises a high-level flowchart illustrating one exemplary embodiment of a method of de-quantizing quantized resource blocks that have been front-hauled over a front-haul network of a C-RAN using variable resolution quantization.

Like reference numbers and designations in the various drawings indicate like elements.

DETAILED DESCRIPTION

Figure 1:
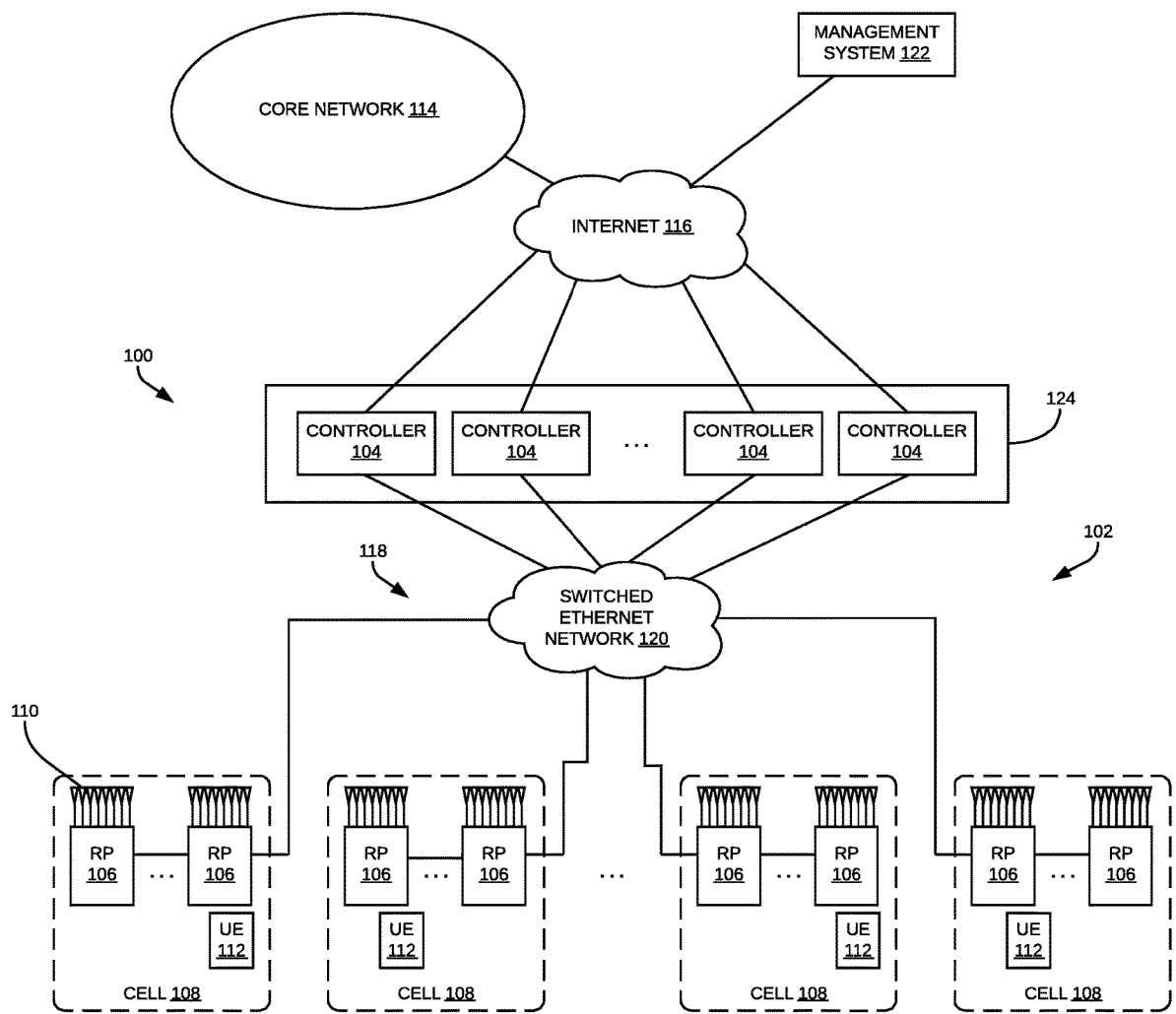
FIG. 1 is a block diagram illustrating one exemplary embodiment of a radio access network (RAN) system.

FIG. 1 is a block diagram illustrating one exemplary embodiment of a radio access network (RAN) system 100 in which the front-haul rate reduction techniques described here can be used. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs multiple baseband units 104 and multiple radio points (RPs) 106. The system 100 is also referred to here as a "C-RAN system" 100. Each RP 106 is remotely located from the baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104.

Each RP 106 includes or is coupled to one or more antennas 110 via which downlink RF signals are radiated to various items of user equipment (UE) 112 and via which uplink RF signals transmitted by UEs 112 are received.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors or configuring a programmable device. Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

The system 100 is coupled to the core network 114 of each wireless network operator over an appropriate back-haul. In the exemplary embodiment shown in FIG. 1, the Internet 116 is used for back-haul between the system 100 and each core network 114. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGW) and a Security Gateway (SeGW) (all of which are not shown). Each controller 104 communicates with the MME and SGW in the EPC core network 114 using the LTE S1 interface over an Internet Protocol Security (IPsec) tunnel established with the SeGW. Also, each controller 104 communicates with other eNodeBs (over the IPsec tunnel) using the LTE X2 interface. For example, each controller 104 can communicate via the LTE X2 interface with an outdoor macro eNodeB (not shown) or another controller 104 in the same cluster 124 (described below) implementing a different cell 108.

If the eNodeB implemented using one or more controllers 104 is a home eNodeB, the core network 114 can also include a Home eNodeB Gateway (not shown) for aggregating traffic from multiple home eNodeBs.

The controllers 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controllers 104 and the radio points 106 can implement one or more of the LTE transmission modes using licensed and/or unlicensed RF bands or spectrum. Moreover, the controllers 104 and/or the radio points 106 can be configured to support multiple air interfaces and/or to support multiple wireless operators.

The controllers 104 are communicatively coupled the radio points 104 using a front-haul network 118. In the exemplary embodiment shown in FIG. 1, the front-haul 118 that communicatively couples each controller 104 to one or more RPs 106 is implemented using a standard switched ETHERNET network 120. However, it is to be understood that the front-haul between the controllers 104 and RPs 106 can be implemented in other ways.

In the exemplary embodiment shown in FIG. 1, a management system 122 is communicatively coupled to the controllers 104 and RPs 106, for example, via the Internet 116 and ETHERNET network 120 (in the case of the RPs 106).

In the exemplary embodiment shown in FIG. 1, the management system 122 communicates with the various elements of the system 100 using the Internet 116 and the ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment shown in FIG. 1, the system 100 comprises multiple controllers 104 that are grouped together into a cluster 124. Each cluster 124 has an associated set of RPs 106 that have been assigned to that cluster 124 and the cells 108 served by the controllers 104 included in that cluster 124. The association of radio points 106 with cells 108 served by the cluster 124 is implemented using a "white list". For each radio point 106 that associated with a cell 108, the white list includes an identifier (for example, a media access control (MAC) address) for that radio point 106 that the white list associates with an identifier for that cell 108 (for example, a logical or virtual cell identifier used within the context of the C-RAN 100). When a controller 104 is configured to serve a particular cell 108 it can reference the white list to determine which radio points 106 it should associate with in order to serve that cell 108.

In this example, at least some of the RPs 106 are implemented as multi-carrier radio points 106. For ease of explanation, all of the RPs 106 shown in FIG. 1 are described here as being implemented as multi-carrier radio points 106. However, it is to be understood that the C-RAN 100 can be implemented using both single-carrier radio points and multi-carrier radio points 106 and a given cell 108 can be served using both single-carrier radio points and multi-carrier radio points 106.

Figure 2:
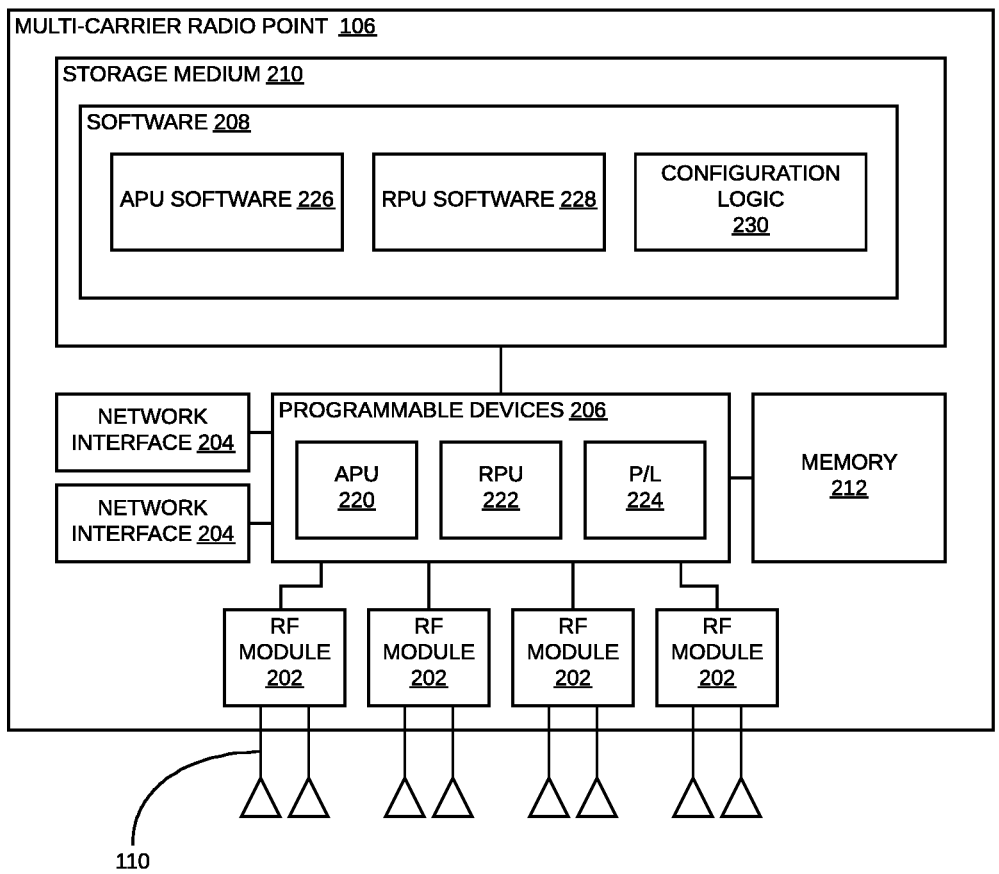
FIG. 2 is a block diagram illustrating one exemplary embodiment of a multi-carrier radio point.

FIG. 2 is a block diagram illustrating one exemplary embodiment of a multi-carrier radio point 106. As shown in FIG. 2, each multi-carrier radio point 106 comprises a plurality of radio frequency (RF) modules 202. Each RF module 202 comprises circuitry that implements the RF transceiver functions for an air interface and interfaces to one or more antennas 110 associated with that RF module 202. More specifically, in the exemplary embodiment shown in FIG. 2, each RF module 202 interfaces with a respective two antennas 110 and comprises circuitry that implements two downlink signal paths, one for each of the two antennas 110, and two uplink signals paths, one for each of the two antennas 110.

In one exemplary implementation, each downlink signal path comprises a respective digital-to-analog converter (DAC) to convert downlink digital samples to a downlink analog signal, a respective frequency converter to upconvert the downlink analog to a downlink analog RF signal at the desired RF frequency, and a respective power amplifier (PA) to amplify the downlink analog RF signal to the desired output power for output via the antenna 110 associated with that downlink signal path. In one exemplary implementation, each uplink signal path comprises a respective low-noise amplifier (LNA) for amplifying an uplink analog RF signal received via the antenna 110 associated with the uplink signal path, a respective frequency converter to downconvert the received uplink analog RF signal to an uplink analog intermediate frequency signal, a respective analog-to-digital converter (ADC) to convert the uplink analog intermediate frequency signal to uplink digital samples. Each of the downlink and uplink signal paths can also include other conventional elements such as filters. Each RF module 202 can be implemented using one or more RF integrated circuits (RFICs) and/or discrete components.

Each multi-carrier radio point 106 further comprises at least one network interface 204 that is configured to communicatively couple the radio point 106 to the front-haul network 118. More specifically, in the exemplary embodiment shown in FIG. 2, each network interface 204 comprises an ETHERNET network interface that is configured to communicatively couple that radio point 106 to the switched ETHERNET network 120 that is used to implement the front-haul 118 for the C-RAN 100. In one exemplary implementation, two 1-Gigabit Ethernet links are used to couple the multi-carrier RP 106 to the front-haul switched Ethernet network 120, in which case the RP 106 includes two 1-Gigabit Ethernet network interfaces 204. In another exemplary implementation, one 2.5-Gigabit Ethernet link is used to couple the multi-carrier RP 106 to the front-haul switched Ethernet network 120, in which case the RP 106 includes one 2.5-Gigabit Ethernet network interface 204.

Each multi-carrier radio point 106 further comprises one or more programmable devices 206 that execute, or are otherwise programmed or configured by, software, firmware, or configuration logic 208 (collectively referred to here as "software"). The one or more programmable devices 206 can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices 206 are used, all of the programmable devices 206 do not need to be implemented in the same way.

The software 208 can be implemented as program instructions or configuration logic that are stored (or otherwise embodied) on an appropriate non-transitory storage medium or media 210 from which at least a portion of the program instructions or configuration logic are read by one or more programmable devices 206 for execution thereby or configuration thereof. The software 208 is configured to cause one or more devices 206 to carry out at least some of the functions described here as being performed by the radio point 106. Although the storage medium 210 is shown in FIG. 2 as being included in the radio point 106, it is to be understood that remote storage media (for example, storage media that is accessible over a network) and/or removable media can also be used. Each radio point 106 also comprises memory 212 for storing the program instructions or configuration logic and/or any related data while the functions implemented by the software 208 are performed.

The multi-carrier radio point 106 is configured to enable processing resources provided by the one or more programmable devices 206 and the hardware resources provided by the RF modules 202 to be flexibly assigned and associated with various carriers and cells 108 used for providing wireless service to UEs 112. As used herein, a "carrier" refers to a logical bi-directional RF channel used for wirelessly communicating with the UEs 112. Where frequency division duplexing (FDD) is used, each "carrier" comprises a respective physical downlink RF carrier used for downlink transmissions and a respective physical uplink RF carrier used for uplink transmissions. Where time division duplexing (TDD) is used, each "carrier" comprises a single physical RF carrier that is used for both downlink and uplink transmissions.

In the exemplary embodiment shown in FIG. 2, the one or more programmable devices 206 comprises a set of application processing units (APUs) 220, a set of real-time processing units (RPUs) 222, and programmable logic 224. In this embodiment, the RPUs 222 and programmable logic 224 are configured to perform latency sensitive functions, and the APUs 220 are used to perform all other functions.

The APUs 220 and RPUs 222 are implemented using one or more processors or processor cores (for example, using one or more ARM processors or processor cores), and the programmable logic 224 is implemented by programming or configuring one or more programmable logic devices (such as one or more FPGAs or CPLDs). The software 208 comprises software 226 executed by the APUs 220 (which is also referred to here as "APU software" 226) and software 228 executed by the RPUs 228 (which is also referred to here as "RPU software" 228). The APU software 226 and the RPU software 228 can communicate with each other, for example, using conventional inter-process communication (IPC) techniques. The APU software 26 and RPU software 228 can communicate with the programmable logic 224 using suitable application programming interfaces (APIs) and device drivers. The software 208 also comprises the configuration logic 230 for the programmable logic devices 224.

In this exemplary embodiment, the APU software 226 is configured to perform management, configuration, and discovery tasks for the radio point 106. The RPU software 228 and configuration logic 230 are configured to perform latency sensitive L1 signal processing functions, whereas the APU software 226 is configured to implement the other L1 signal processing functions as well as to manage and configure such L1 signal processing. It is to be understood, however, that the software 208 can be implemented in other ways.

The multi-carrier radio point 106 is configured so that the processing and hardware resources provided by the radio point 106 can be associated with controllers 104 in the cluster 124 in a flexible manner. A single multi-carrier radio point 106 can be used with multiple controllers 104 to serve multiple cells 108, where the processing and hardware resources used for the multiple controllers 104 need not be configured and used in the same way. The multi-carrier radio point 106 is not "hardwired" to operate in certain radio point configurations. Instead, the multi-carrier radio point 106 can be configured at run-time to use the desired radio point configurations. Each controller 104 that is used with the multi-carrier radio point 106 automatically discovers the radio point 106 and claims and configures the resources it needs from those that are provided by the radio point 106.

For example, an RF plan can be developed for the site 102 that identifies where the coverage areas of the various cells 108 need to be located and where radio points 106 need to be deployed in order to provide the desired coverage areas. The association of radio points 106 and cells 108 can be configured by specifying which radio points 106 are to be associated with each cell 108. As noted above, the association of radio points 106 with cells 108 is implemented using the white list. When a controller 104 in the cluster 124 is configured to serve a particular cell 108, the controller 104 uses the white list to determine which radio points 106 should be homed to that controller 104 in order to serve that cell 108. Also, the configuration information maintained with the white list also specifies what resources of each assigned radio point 106 should be used to serve the associated cell 108 and how they should be configured. The controller 104 then uses this information to claim and configure the relevant resources of the assigned radio points 106 at run time. In this way, the various radio points 106 do not need to be individually manually configured. Instead, the controllers 104 can automatically discover, claim, and configure the resources provided by the multi-carrier radio points 106.

Generally, for each cell 108 implemented by the C-RAN 100, the corresponding controller 104 performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions. Different splits in the air-interface L1 processing between the controller 104 and the radio points 106 can be used.

For example, with one L1 split, each baseband controller 104 is configured to perform all of the digital Layer-1, Layer-2, and Layer-3 processing for the air interface, while the RPs 106 implement only the analog RF transceiver functions for the air interface and the antennas 110 associated with each RP 106. In that case, in-phase and quadrature (IQ) data representing time-domain symbols for the air interface is communicated between the controller 104 and the RPs 106.

In another example, a different L1 split is used in order to reduce the amount of data front-hauled between the controller 104 and the RPs 106. With this L1 split, the data front-hauled between the controller 104 and the RPs 106 is communicated as IQ data representing frequency-domain symbols for the air interface. This frequency-domain IQ data represents the symbols in the frequency domain before the inverse fast Fourier transform (IFFT) is performed, in the case of the downlink, and after the fast Fourier transform (FFT) is performed, in the case of the uplink. If this L1 split is used for downlink data, the IFFT and subsequent transmit L1 processing would be performed in each RP 106. Also, if this L1 split is used for uplink data, the FFT and subsequent receive L1 processing would be performed in the controller 104.

The front-hauled IQ data can also be quantized in order to reduce the amount of front-haul bandwidth that is required. For example, where the front-hauled IQ data comprises frequency-domain symbols, the front-hauled IQ data can be generated by quantizing the IQ data representing the frequency-domain symbols without guard band zeroes or any cyclic prefix and communicating the resulting quantized frequency-domain IQ data over the front-haul ETHERNET network 120. More specifically, where the original IQ data representing the frequency-domain symbols uses 15 bits for the in-phase (I) component and 15 bits for the quadrature (Q) component of each IQ data element, the quantized IQ data can be produced by quantizing the I component using, for example, an 8-bit or 6-bit resolution and quantizing the Q component also using, for example, an 8-bit or 6-bit resolution. The quantization can be performed using any suitable quantization technique. Also, quantization can also be used where the front-hauled IQ data comprises time-domain symbols.

Additional details regarding front-hauling frequency-domain IQ data can be found in U.S. patent application Ser. No. 13/762,283, filed on Feb. 7, 2013, and titled "RADIO ACCESS NETWORKS," which is hereby incorporated herein by reference.

The L1-split used for downlink front-haul data (that is, data front-hauled from the controller 104 to the RPs 106) can differ from the L1-split used for downlink front-haul data (that is, data front-hauled from the RPs 106 to the controller 104). Also, for a given direction (downlink or uplink), not all front-haul data needs to be communicated in the same form (that is, the front-haul data for different channels or for different resource blocks can be communicated in different ways).

In this example, at least some of the RPs 106 are implemented as multi-carrier radio points 106. That is, a single RP 106 is used to serve multiple cells 108. As a result, multiple sets of IQ data need to be front-hauled between the serving controllers 104 and that multi-carrier RP 106. However, the bandwidth of the front-haul communication links can be a constraint for some multi-carrier RPs 106. For example, in one exemplary implementation, a multi-carrier RP 106 supports four carriers using two antennas for each carrier. In this exemplary implementation, the multi-carrier RP 106 uses only two 1-Gigabit Ethernet links to couple the RP 106 to the front-haul switched Ethernet network 120. Using a fixed quantization scheme for the front-hauled IQ data that uses 8 bits for the in-phase (I) component and 8 bits for the quadrature (Q) component of each IQ data element and one byte per antenna for scaling, 50 bytes is required to front-haul each LTE symbol position of a LTE resource block (RB), which involves 12 IQ data elements (one for each of the 12 LTE subcarriers) per antenna for each symbol position, 2 bytes per IQ data element, and 1 scaling byte per antenna for each symbol position. That is, the number of bytes required to front-haul each LTE symbol position of each LTE RB is:

((12 IQ data elements per antenna for each symbol position×2 bytes per IQ data element)+1 scaling byte per antenna for each symbol position)×2 antennas=50 bytes per symbol position of each RB When the maximum LTE channel bandwidth (that is, 20 Megahertz (MHz)) is used for a given carrier, a maximum of 100 RBs can be communicated in the uplink. Therefore, assuming that all four carriers are using the maximum LTE channel bandwidth, the maximum front-haul data rate for such an implementation of a multi-carrier RP 106 can be calculated by as follows:

4 carriers×50 bytes per symbol position of each RB×100 RBs per carrier×8 bits per byte×14× $10^3$ symbol positions per second=2.24 Gigabits per second (Gbps)

However, this peak uplink Ethernet data rate of 2.24 Gbps exceeds the front-haul data rate of 2.0 Gbps provided by the two 1-Gigabit Ethernet links used to couple the multi-carrier RP 106 to the front-haul switched Ethernet network 120 in this example.

The required front-haul Ethernet data rate could be reduced by using a quantization resolution less than 8 bits for the I and Q components of each IQ element. For example, if a quantization resolution of 6 bits for the I and Q components of each IQ element were to be used, 38 bytes would be required to front-haul each LTE symbol position of each LTE RB, which involves 12 IQ data elements (one for each of the 12 LTE subcarriers) per antenna for each symbol position of each RB, 12 bits per IQ data element, 1 scaling byte per antenna for each symbol position and 8 bits per byte. That is, the number of bytes required to front-haul each LTE symbol position of each LTE RB would be:

((12 IQ data elements per antenna for each symbol position of each RB×12 bits per IQ data element)/8 bits per bytes+1 scaling byte per antenna for each symbol position)×2 antennas=38 bytes per RB This corresponds to a peak uplink Ethernet data rate of 1.7 Gbps, which is calculated as follows:

4 carriers×38 bytes per each symbol position of each RB×100 RBs per carrier×8 bits per byte×14× $10^3$ symbol positions per second=1.7 Gigabits per second (Gbps)

This peak uplink Ethernet data rate of 1.7 Gbps is below the front-haul data rate of 2.0 Gbps provided by the two 1-Gigabit Ethernet links used to couple the multi-carrier RP 106 to the front-haul switched Ethernet network 120 in this example. However, reducing quantization resolution degrades the signal-to-interference-plus-noise ratio (SINR) for the resulting decompressed RBs. Therefore, in the exemplary embodiment described here in connection with FIGS. 1-3, a variable quantization scheme is used in order to reduce the peak front-haul data rate, while attempting to minimize (or at least reduce) SINR degradation in manner that is fair to all carriers served by the RP 106.

FIG. 3 comprises a high-level flowchart illustrating one exemplary embodiment of a method 300 of using variable resolution quantization to front-haul at least some IQ data in a C-RAN 100. The embodiment of method 300 shown in FIG. 3 is described here as being implemented in the C-RAN 100 described above in connection with FIG. 1 using the multi-carrier radio point 106 described above in connection with FIG. 2, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

Method 300 can be used for either downlink or uplink front-haul data. When variable-resolution quantization is used for front-hauling downlink data, the processing associated with method 300 is implemented in the controller 104 (or controllers 104) sending the front-haul IQ data. When variable-resolution quantization is used for front-hauling uplink data, the processing associated with method 300 is implemented in the radio point 106 sending the front-haul IQ data.

Method 300 is especially well suited for use in quantizing and front-hauling uplink data from a multi-carrier radio point over a switched Ethernet front-haul network. However, it is to be understand that method 300 can be used to quantize and front-haul data in other embodiments. For example, method 300 would also be well suited for use in embodiments where each controller 104 in the cluster 124 serves a single carrier and cell 108 but more than one of the controllers 104 share the communication links that couple those controllers 104 to the front-haul network 118 or where a single controller 104 serves multiple carriers and cells 108 but the downlink front-haul data for the multiple carriers is communicated over shared communication front-hauled links. Method 300 can be used in other embodiments.

For example, method 300 can be used to quantize and front-haul data other than in a C-RAN and/or to quantize and front-haul data over other types of front-haul links (for example, over synchronous point-to-point links that implement one or more of the Common Public Radio Interface (CPRI), the Open Radio equipment Interface (ORI), or Open Base Station Architecture (OBSAI) specifications). Also, although method 300 is described here in connection with an exemplary embodiment implemented for use with the LTE family of standards, it is to be understood that other embodiments can be implemented in other ways. For example, other embodiments can be implemented for use with other wireless air interface standards, in addition or instead of LTE (for example, wherein the multi-carrier radio point 106 supports multiple air interface standards).

Moreover, although method 300 is described here in connection with an exemplary embodiment that use 8-bit quantization for the high-resolution quantization and 6-bit quantization for the low-resolution quantization, it is to be understood that other embodiments can be implemented in other ways (for example, using different resolutions for the high-resolution quantization and/or the low-resolution quantization)

Method 300 is performed for each symbol position of each resource block for all of the carriers supported by the RP 106. The particular symbol position for which method 300 is described here as being performed is referred to here as the "current" symbol position.

Method 300 comprises determining the number of required resource blocks for the current symbol position for each carrier (block 302). In the exemplary embodiment described here, this is done by determining, for each active carrier k of the RP 106, the number of resource blocks that have actual UE signal data to be front-hauled for the current symbol position using that carrier k. This number of resource blocks is also referred to here as the number of "required" resource blocks for a given carrier k and is represented by the variable $M\_k$.

Method 300 further comprises determining the number of high-resolution resource blocks to be used for the current symbol position (block 304). In the exemplary embodiment described here, the number of high-resolution resource blocks to be used for the current symbol position is determined as a function of a difference between a nominal per-symbol-position front-haul link capacity and a link capacity needed to front-haul the required resource blocks for all of the carriers if quantized using a lower resolution. In this exemplary embodiment, the required resource blocks for all of the carriers can be determined by summing the number of required resource blocks $M\_k$ for the current symbol position across all active carriers. This total number of required resource blocks for the current symbol position is represented by the variable M.

In this exemplary embodiment, a nominal front-haul link capacity per symbol position (represented here by the variable Cbytes) is the total capacity per symbol position of the Ethernet links used to couple the RP 106 to the front-haul switched Ethernet network 120 reduced by a predetermined headroom amount (for example, around 5% of the total capacity). For example, where the RP 106 is coupled to the front-haul switched Ethernet network 120 using two 1-Gigabit Ethernet links, the total capacity per symbol position of the Ethernet links is (2 links×1×10$^9$ bits per second/8 bits per byte)/14×10$^3$ symbols per second is 17,857 bytes per symbol, which is reduced by a headroom amount of about 5% to arrive at a nominal front-haul link capacity per symbol position Cbytes of 16,000 bytes. In another example, where the RP 106 is coupled to the front-haul switched Ethernet network 120 using one 2.5-Gigabit Ethernet link, total capacity per symbol position of the Ethernet links is (1 link×2.5×10$^9$ bits per second/8 bits per byte)/14×10$^3$ symbols per second is 22,321 bytes per symbol, which is reduced by a headroom amount of about 5% to arrive at a nominal front-haul link capacity per symbol position Cbytes of 20,000 bytes. To avoid overloading the front-haul links with the front-haul traffic for the current symbol position, the following condition must be satisfied:

$$\text{BYTES\_PER\_HIGH\_RES\_RB} \times \text{NO\_OF\_HIGH\_RES\_RB} + \text{BYTES\_PER\_LOW\_RES} \times (M - \text{NO\_OF\_HIGH\_RES\_RB}) \leq C\text{bytes}$$

where "BYTES_PER_HIGH_RES_RB" is the number of bytes required to front-haul a symbol position of a resource block quantized using the high quantization resolution (8 bits in this example), "NO_OF_HIGH_RES_RB" is the number of resource blocks that are quantized using the high quantization resolution for the current symbol position, "BYTES_PER_LOW_RES" is the number of bytes required to front-haul a symbol position of a resource block quantized using the low quantization resolution (6 bits in this example), where "M" is, as noted above, the total number of required resource blocks for the current symbol position across all carriers, and "CBytes" is, as noted above, a nominal front-haul link capacity per symbol position. In this regard, it is noted that the total number of required resource blocks for the current symbol position across all carriers M equals the number of resource blocks that are quantized using the high quantization resolution for the current symbol position NO_OF_HIGH_RES_RB plus the number of resource blocks that are quantized using the low quantization resolution for the current symbol position. Thus, "M−NO_OF_HIGH_RES_RB" in the above condition represents the number of resource blocks that are quantized using the low quantization resolution for the current symbol position.

The number of resource blocks that can be quantized using the high quantization resolution for the current symbol position can be determined by solving for the variable NO_OF_HIGH_RES_RB in the above condition:

$$\text{NO\_OF\_HIGH\_RES\_RB} = \text{Minimum}\{M, \text{Floor}\{(C\text{bytes} - \text{BYTES\_PER\_LOW\_RES\_RB} \times M) \div (\text{BYTES\_PER\_HIGH\_RES\_RB} - \text{BYTES\_PER\_LOW\_RES\_RB})\}\}$$

The difference between the nominal front-haul link capacity per symbol position Cbytes and the number of bytes needed to front-haul the total number of required resource blocks for the current symbol position across all carriers M using the low quantization resolution NO_OF_LOW_RES_RB (that is, the difference Cbytes−BYTES_PER_LOW_RES_RB×M) represents the additional front-haul link capacity that is available to use to quantize some of the resource blocks using the high quantization resolution. The number of resource blocks for the current symbol position that can be quantized using high resolution NO_OF_HIGH_RES_RB then can be determined by dividing this available additional front-haul link capacity by the additional number of bytes required to front-haul a resource block that has been quantized using the high quantization resolution instead of using the low quantization resolution (that is, (BYTES_PER_HIGH_RES_RB−BYTES_PER_LOW_RES_RB)). The result of this division operation is rounded down. If the result is equal to or greater than the total number of required resource blocks for the current symbol position across all carriers M, then all of the required resource blocks for the current symbol position across all carriers M can be quantized using the high resolution. That is, in this case, the variable NO_OF_HIGH_RES_RB=M. Otherwise, the result of this division is rounded down and used as the number of resource blocks for the current symbol position that can be quantized using high resolution NO_OF_HIGH_RES_RB.

In this example where the high quantization resolution is 8 bits and the low quantization resolution is 6 bits, as noted above, 50 bytes are required to front-haul a symbol position of an LTE resource block quantized using 8 bits of resolution, and 38 bytes are required to front-haul a symbol position of an LTE resource block quantized using 6 bits of resolution. In this example, the number of resource blocks that can be quantized using the high quantization resolution for the current symbol position can be determined as follows:

NO_OF_HIGH_RES_RB=Minimum{$M$,Floor{($C$bytes−38×$M$)/(50−38)}}

Method 300 further comprises allocating the high-resolution resource blocks to each of the carriers (block 306). The allocation scheme in this example can be stated as follows. The carriers k can be sorted in ascending order based on the number of required resource blocks for the current symbol position for each carrier k (that is, sorted from the carrier k with the lowest number of required resource blocks for the current symbol position to the carrier k with the highest number of required resource blocks for the current symbol position). Then, an allocation for each carrier k is determined in this sorted order. For each carrier k, the number of remaining unallocated high-resolution resource blocks is divided by the number of carriers remaining to be allocated high-resolution resource blocks (including the carrier for which this calculation is being performed) in order to determine an initial allocation. If the initial allocation is less than or equal to the number of required resource blocks for that carrier k, then this initial allocation is allocated to that carrier k. If the initial allocation is greater than the number of required resource blocks for that carrier k, then only the number of required resource blocks for that carrier k is allocated to that carrier k and the unused portion of this initial allocation remains unallocated for possible equal allocation to the remaining carriers (if needed). In either case, the number of unallocated high-resolution resource blocks is reduced accordingly. This process is repeated for all of the carriers k in the sorted order.

Method 300 further comprises determining which resource blocks for each carrier to quantize using high resolution (block 308). The specific resource blocks to be quantized with high resolution quantization must be identified for each carrier. In one implementation, the resource blocks to be quantized with high resolution for a given carrier are identified by selecting successive even-indexed resource blocks taken in ascending order and then odd-indexed resource blocks taken in ascending order until all of the high-resolution resource blocks have been identified for that carrier. This scheme distributes the high-resolution resource blocks among all allocated UEs 110 for that carrier.

In another implementation, the resource blocks to be quantized in the current symbol position for a given carrier are sorted in descending order of average power or allocated modulation and coding scheme (MCS). Then, the resource blocks to be quantized with high resolution in the current symbol position are identified by selecting successive resource blocks in that order until all of the high-resolution resource blocks have been identified. This scheme selects for high resolution quantization those resource blocks that will experience relatively more SINR degradation if lower resolution quantization were to be used. Resource blocks with lower power or allocated MCS experience relatively less SINR degradation due to lower resolution quantization because noise in those resource block due to something other than quantization noise is higher.

Method 300 further comprises quantizing the required resource blocks using the appropriate resolution (block 310) and front-hauling the quantized resource blocks (block 312). The required resource blocks for the current symbol position that have been selected for high resolution quantizing are quantized using high resolution, while the other required resource blocks for the current symbol position are quantized using low resolution. The resulting quantized resource blocks are then front-hauled over the front-haul network 118 (which is implemented using a switched ETHERNET network 120 in this exemplary embodiment).

By using the variable-resolution quantization technique of method 300, lower resolution quantization can be used efficiently by using high resolution quantization for as many resource blocks as is permitted by the available front-haul capacity while fairly allocating the higher resolution quantization and any SINR degradation resulting from using lower resolution quantization across of the of the carriers.

After the quantized resource blocks have been front-hauled over the front-haul network 118, the receiving entity (be it the controller 104 for uplink front-hauled data or a radio point 106 for downlink front-hauled data) de-quantizes the quantized resource blocks that have been front-hauled over the front-haul network 118. One example of how this can be done is illustrated in FIG. 4.

FIG. 4 comprises a high-level flowchart illustrating one exemplary embodiment of a method 400 of de-quantizing quantized resource blocks that have been front-hauled over a front-haul network of a C-RAN using variable resolution quantization. The embodiment of method 400 shown in FIG. 4 is described here as being implemented in the C-RAN 100 described above in connection with FIG. 1 using the multi-carrier radio point 106 described above in connection with FIG. 2 where quantized resource blocks have been front-hauled using variable resolution quantization as described in connection with FIG. 3, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

Method 400 can be used for either downlink or uplink front-haul data. The processing associated with method 400 is performed by the entity that receives the quantized resource blocks that have been front-hauled over the front-haul network 118. Where at least some uplink front-haul data is quantized using the variable resolution quantization techniques described here, the receiving controller 104 performs the processing of method 400 to de-quantizes such uplink front-haul data. Where at least some downlink front-haul data is quantized using the variable resolution quantization techniques described here, the receiving radio point 106 performs the processing of method 400 to de-quantizes such downlink front-haul data.

As with method 300, method 400 is especially well suited for use uplink data sent from a multi-carrier radio point over a switched Ethernet front-haul network. However, it is to be understand that method 400 can be used to de-quantize front-hauled quantized data in other embodiments. For example, method 400 would also be well suited to de-quantize front-hauled quantized downlink data received by radio points where each serving controller 104 in the cluster 124 serves a single carrier and cell 108 but more than one of the controllers 104 share the communication links that couple those controllers 104 to the front-haul network 118 or where a single serving controller 104 serves multiple carriers and cells 108 but the downlink front-haul data for the multiple carriers is communicated over shared communication front-hauled links. Method 400 can be used in other embodiments. For example, method 400 can be used to de-quantize front-hauled quantized data other than in a C-RAN, and/or to de-quantize quantized data front-hauled over other types of front-haul links (for example, over synchronous point-to-point links that implement one or more of the CPRI, ORI, or OBSAI specifications). Also, although method 400 is described here in connection with an exemplary embodiment implemented for use with the LTE family of standards, it is to be understood that other embodiments can be implemented in other ways. For example, other embodiments can be implemented for use with other wireless air interface standards, in addition or instead of LTE (for example, wherein the multi-carrier radio point 106 supports multiple air interface standards).

Moreover, as with method 300, although method 400 is described here in connection with an exemplary embodiment that use 8-bit quantization for the high-resolution quantization and 6-bit quantization for the low-resolution quantization, it is to be understood that other embodiments can be implemented in other ways (for example, using different resolutions for the high-resolution quantization and/or the low-resolution quantization)

Method 400 is performed for each symbol position of each received front-hauled quantized resource block. The particular symbol position for which method 400 is described here as being performed is referred to here as the "current" symbol position.

Method 400 comprises checking the size of the received quantized resource block for the current symbol position (block 402). If the size matches the size that is associated with the use of high-resolution quantization, then the resource block for that symbol position is de-quantized assuming it was quantized using high-resolution quantization (block 404). If the size matches the size that is associated with the use of low-resolution quantization, then the resource block for that symbol position is de-quantized assuming it was quantized using low-resolution quantization (block 406).

Other mechanisms for indicating and/or determining whether each quantized resource block was quantized using high-resolution quantization or low-resolution quantization can be used.

Although methods 300 and 400 have been described in connection with a particular exemplary embodiment implemented in the C-RAN 100 of FIG. 1 and using the radio point 106 of FIG. 2, it is to be understood that methods 300 and 400 can be implemented in other ways. For example, methods 300 and 400 can be used for either downlink or uplink front-haul data, can be used with various types of front-haul links and/or air interface standards, and/or can be used with different quantization resolutions for either or both of the high and low quantization resolutions.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system to provide wireless service to user equipment comprising: one or more controllers communicatively coupled to a core network; and a plurality of radio points to wirelessly transmit and receive radio frequency signals to and from the user equipment using one or more carriers and one or more air interfaces, each of the radio points associated with at least one antenna and located remote from the controller; wherein each of the plurality of radio points is communicatively coupled to the one or more controllers via a front-haul network; wherein each controller configured to perform at least some Layer-3, Layer-2, and Layer-1 processing for at least one of the air interfaces; wherein the system is configured to use variable resolution quantization to front-haul at least some data over the front-haul network by doing the following, for each symbol position: determine a respective number of required resource blocks having respective actual user-equipment (UE) signal data to front-haul for each carrier; determine a number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution; allocate the high-resolution resource blocks to each carrier; determine, for each carrier, which of the required resource blocks to quantize at the higher resolution; quantize each of the required resource blocks using either the higher resolution or the lower resolution depending on whether it was determined to quantize that required resource block at the higher resolution or not; and front-haul the quantized required resource blocks over the front-haul network.

Example 2 includes the system of Example 1, wherein the system is configured to, for each symbol position, allocate the high-resolution resource blocks to each carrier by doing the following: sort the carriers based on the respective number of required resource blocks determined for each carrier; for each successive carrier as sorted: determine an initial allocation for that carrier by dividing the unallocated portion of the high-resolution resource blocks by the number of carriers that have not been allocated the high-resolution resource blocks; if the initial allocation is less than or equal to the respective number of required resource blocks determined for that carrier, allocate to that carrier a portion of the high-resolution resource blocks that is equal to the initial allocation; and if the initial allocation is greater than the respective number of required resource blocks determined for that carrier, allocate to that carrier a portion of the high-resolution resource blocks that is equal to the respective number of required resource blocks determined for that carrier.

Example 3 includes the system of any of Examples 1-2, wherein the system is configured to, for each symbol position, determine, for each of the carriers, which of the required resource blocks to quantize at the higher resolution by doing at least one of the following: (a) for each carrier: selecting successive even-indexed required resource blocks for that carrier taken in ascending order and then odd-indexed required resource blocks for that carrier taken in ascending order until all of the high-resolution resource blocks allocated to that carrier have been selected; and (b) for each carrier: sorting the required resource blocks for that carrier in descending order of average power or allocated modulation and coding scheme (MCS); and selecting successive sorted required resource blocks for that carrier to quantize at the higher resolution until all of the high-resolution resource blocks allocated to that carrier have been selected.

Example 4 includes the system of any of Examples 1-3, wherein the system is configured to de-quantize each quantized resource block for each symbol position front-hauled using the variable resolution quantization by doing the following: determining a size of that quantized resource block; de-quantize that quantized resource block assuming that quantized resource block was quantized using the high resolution if the size of that quantized resource block is associated with the high resolution; and de-quantize that quantized resource block assuming that quantized resource block was quantized using the low resolution if the size of that quantized resource block is associated with the low resolution.

Example 5 includes the system of any of Examples 1-4, wherein the variable resolution quantization performed by at least one of: at least one of the radio points to quantize and front-haul uplink front-haul data; and at least one of the controllers to quantize and front-haul downlink front-haul data.

Example 6 includes the system of any of Examples 1-5, wherein at least some of the radio points comprises multi-carrier radio points, wherein each multi-carrier radio point is configured to use the variable resolution quantization for uplink front-haul data sent from that multi-carrier radio point.

Example 7 includes the system of any of Examples 1-6, wherein the higher resolution comprises 8-bit resolution, and the lower resolution comprises 6-bit resolution.

Example 8 includes the system of any of Examples 1-7, wherein the front-haul network comprises a switched Ethernet front-haul network.

Example 9 includes a method of using variable resolution quantization to front-haul at least some data over a front-haul network in a system configured to provide wireless service to user equipment, the system comprising one or more controllers communicatively coupled to a core network and a plurality of radio points to wirelessly transmit and receive radio frequency signals to and from the user equipment using one or more carriers and one or more air interfaces, each of the radio points associated with at least one antenna and located remote from the controller, wherein each of the plurality of radio points is communicatively coupled to the one or more controllers via a front-haul network and wherein each controller configured to perform at least some Layer-3, Layer-2, and Layer-1 processing for at least one of the air interfaces, the method comprising: for each symbol position front-hauled over the front-haul network: determining a respective number of required resource blocks having respective actual user-equipment (UE) signal data to front-haul for each carrier; determining a number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution; allocating the high-resolution resource blocks to each carrier; determining, for each carrier, which of the required resource blocks to quantize at the higher resolution; quantizing each of the required resource blocks using either the higher resolution or the lower resolution depending on whether it was determined to quantize that required resource block at the higher resolution or not; and front-hauling the quantized required resource blocks over the front-haul network.

Example 10 includes the method of Example 9, wherein, for each symbol position, allocating the high-resolution resource blocks to each carrier comprises doing the following: sorting the carriers based on the respective number of required resource blocks determined for each carrier; for each successive carrier as sorted: determining an initial allocation for that carrier by dividing the unallocated portion of the high-resolution resource blocks by the number of carriers that have not been allocated the high-resolution resource blocks; if the initial allocation is less than or equal to the respective number of required resource blocks determined for that carrier, allocating to that carrier a portion of the high-resolution resource blocks that is equal to the initial allocation; and if the initial allocation is greater than the respective number of required resource blocks determined for that carrier, allocating to that carrier a portion of the high-resolution resource blocks that is equal to the respective number of required resource blocks determined for that carrier.

Example 11 includes the method of any of Examples 9-10, wherein, for each symbol position, determining, for each of the carriers, which of the required resource blocks to quantize at the higher resolution comprises doing at least one of the following: (a) for each carrier: selecting successive even-indexed required resource blocks for that carrier taken in ascending order and then odd-indexed required resource blocks for that carrier taken in ascending order until all of the high-resolution resource blocks allocated to that carrier have been selected; and (b) for each carrier: sorting the required resource blocks for that carrier in descending order of average power or allocated modulation and coding scheme (MCS); and selecting successive sorted required resource blocks for that carrier to quantize at the higher resolution until all of the high-resolution resource blocks allocated to that carrier have been selected.

Example 12 includes the method of any of Examples 9-11, wherein the method further comprises de-quantizing each quantized resource block for each symbol position front-hauled using the variable resolution quantization by doing the following: determining a size of that quantized resource block; de-quantize that quantized resource block assuming that quantized resource block was quantized using the high resolution if the size of that quantized resource block is associated with the high resolution; and de-quantize that quantized resource block assuming that quantized resource block was quantized using the low resolution if the size of that quantized resource block is associated with the low resolution.

Example 13 includes the method of any of Examples 9-12, wherein the method is performed by at least one of: at least one of the radio points to quantize and front-haul uplink front-haul data; and at least one of the controllers to quantize and front-haul downlink front-haul data.

Example 14 includes the method of any of Examples 9-13, wherein at least some of the radio points comprises multi-carrier radio points, wherein the method is performed by each multi-carrier radio point to quantize uplink front-haul data sent from that multi-carrier radio point.

Example 15 includes the method of any of Examples 9-14, wherein the higher resolution comprises 8-bit resolution, and the lower resolution comprises 6-bit resolution.

Example 16 includes the method of any of Examples 9-15, wherein the front-haul network comprises a switched Ethernet front-haul network.

Example 17 includes a multi-carrier radio point for use in a system to provide wireless service to user equipment, the system comprising one or more controllers communicatively coupled to a core network; and a plurality of radio points including the multi-carrier radio point, wherein each controller configured to perform at least some Layer-3, Layer-2, and Layer-1 processing for at least one of the air interfaces, the multi-carrier radio point comprising: at least one interface to communicatively couple the multi-carrier radio point to a front-haul network used for front-hauling data between the controllers and the multi-carrier radio point; at least one programmable device; and at least one radio frequency module configured to wirelessly transmit and receive radio frequency signals to and from the user equipment using one or more carriers and one or more air interfaces; wherein the at least one programmable device is configured to use variable resolution quantization to front-haul at least some data over the front-haul network by doing the following, for each symbol position front-hauled over the front-haul network: determine a respective number of required resource blocks having respective actual user-equipment (UE) signal data to front-haul for each carrier; determine a number of high-resolution resource blocks that can be quantized at a higher resolution as a function of a difference between a nominal per-symbol-position front-haul link capacity and a link capacity needed to front-haul the required resource blocks for all of the carriers if quantized using a lower resolution; allocate the high-resolution resource blocks to each carrier; determine, for each carrier, which of the required resource blocks to quantize at the higher resolution; quantize each of the required resource blocks using either the higher resolution or the lower resolution depending on whether it was determined to quantize that required resource block at the higher resolution or not; and front-haul the quantized required resource blocks over the front-haul network.

Example 18 includes the multi-carrier radio point of Example 17, wherein the at least one programmable device is configured to, for each symbol position, allocate the high-resolution resource blocks to each carrier by doing the following: sort the carriers based on the respective number of required resource blocks determined for each of the carriers; for each successive carrier as sorted: determine an initial allocation for that carrier by dividing the unallocated portion of the high-resolution resource blocks by the number of carriers that have not been allocated the high-resolution resource blocks; if the initial allocation is less than or equal to the respective number of required resource blocks determined for that carrier, allocate to that carrier a portion of the high-resolution resource blocks that is equal to the initial allocation; and if the initial allocation is greater than the respective number of required resource blocks determined for that carrier, allocate to that carrier a portion of the high-resolution resource blocks that is equal to the respective number of required resource blocks determined for that carrier.

Example 19 includes the multi-carrier radio point of any of Examples 17-18, wherein the at least one programmable device is configured to, for each symbol position, determine, for each of the carriers, which of the required resource blocks to quantize at the higher resolution by doing at least one of the following: (a) for each carrier: selecting successive even-indexed required resource blocks for that carrier taken in ascending order and then odd-indexed required resource blocks for that carrier taken in ascending order until all of the high-resolution resource blocks allocated to that carrier have been selected; and (b) for each carrier: sorting the required resource blocks for that carrier in descending order of average power or allocated modulation and coding scheme (MCS); and selecting successive sorted required resource blocks for that carrier to quantize at the higher resolution until all of the high-resolution resource blocks allocated to that carrier have been selected.

Example 20 includes the multi-carrier radio point of any of Examples 17-19, wherein the front-haul network comprises a switched Ethernet front-haul network; and wherein the at least one interface to communicatively couple the multi-carrier radio point to the front-haul network comprises at least Ethernet interface to couple the multi-carrier radio point to the switched Ethernet front-haul network.

What is claimed is:

1. A system to provide wireless service to user equipment comprising:
one or more controllers; and
a radio point to wirelessly transmit and receive radio frequency signals to and from the user equipment using one or more carriers and one or more air interfaces, the radio point associated with at least one antenna;
wherein the radio point is communicatively coupled to the one or more controllers via a front-haul network;
wherein each controller is configured to perform at least some processing for the system;
wherein the system is configured to use variable resolution compression to front-haul at least some data over the front-haul network by doing the following, for each symbol position:
determine a respective number of required resource blocks having respective actual user-equipment signal data to front-haul for each carrier;
determine a number of high-resolution resource blocks that can be compressed at a higher resolution as a function of a difference between a nominal per-symbol-position front-haul link capacity and a link capacity needed to front-haul the required resource blocks for all of the carriers if compressed using a lower resolution;
allocate the high-resolution resource blocks to each carrier;
determine, for each carrier, which of the required resource blocks to compress at the higher resolution;
compress each of the required resource blocks using either the higher resolution or the lower resolution depending on whether it was determined to compress that required resource block at the higher resolution or not; and
front-haul the compressed required resource blocks over the front-haul network.

2. The system of claim 1, wherein the system is configured to, for each symbol position, allocate the high-resolution resource blocks to each carrier by doing the following:
sort the carriers based on the respective number of required resource blocks determined for each carrier;
for each successive carrier as sorted:
determine an initial allocation for that carrier by dividing the unallocated portion of the high-resolution resource blocks by the number of carriers that have not been allocated the high-resolution resource blocks;
if the initial allocation is less than or equal to the respective number of required resource blocks determined for that carrier, allocate to that carrier a portion of the high-resolution resource blocks that is equal to the initial allocation; and
if the initial allocation is greater than the respective number of required resource blocks determined for that carrier, allocate to that carrier a portion of the high-resolution resource blocks that is equal to the respective number of required resource blocks determined for that carrier.

3. The system of claim 1, wherein each controller is configured to perform at least one of:
at least some Layer-3 processing for at least one of the air interfaces;
at least some Layer-2 processing for at least one of the air interfaces; and
at least some Layer-1 processing for at least one of the air interfaces.

4. The system of claim 1, wherein the radio point is located remote from the one or more controllers.

5. The system of claim 1, wherein said one or more controllers comprises multiple controllers, each of the multiple controllers using at least one of the one or more carriers; and
wherein the radio point is shared among the multiple controllers.

6. The system of claim 1, further comprising a plurality of radio points, wherein at least one of said one or more controllers is used with multiple radio points in order to serve a cell.

7. The system of claim 1, wherein the system is configured to use variable resolution quantization as the variable resolution compression;
wherein the system is configured to, for each symbol position, determine the number of high-resolution resource blocks that can be compressed at the higher resolution by determining the number of high-resolution resource blocks that can be quantized at the higher resolution;
wherein the system is configured to, for each symbol position, determine, for each carrier, which of the required resource blocks to compress at the higher resolution by determining, for each carrier, which of the required resource blocks to quantize at the higher resolution;
wherein the system is configured to, for each symbol position, compress each of the required resource blocks using either the higher resolution or the lower resolution by quantizing each of the required resource blocks using either the higher resolution or the lower resolution depending on whether it was determined to quantize that required resource block at the higher resolution or not; and
wherein the system is configured to, for each symbol position, front-haul the compressed required resource blocks over the front-haul network by front-hauling the quantized required resource blocks over the front-haul network.

8. The system of claim 7, wherein the system is configured to, for each symbol position, determine, for each of the carriers, which of the required resource blocks to quantize at the higher resolution by doing at least one of the following:
(a) for each carrier:
selecting successive even-indexed required resource blocks for that carrier taken in ascending order and then odd-indexed required resource blocks for that carrier taken in ascending order until all of the high-resolution resource blocks allocated to that carrier have been selected; and
(b) for each carrier:
sorting the required resource blocks for that carrier in descending order of average power or allocated modulation and coding scheme (MCS); and
selecting successive sorted required resource blocks for that carrier to quantize at the higher resolution until all of the high-resolution resource blocks allocated to that carrier have been selected.

9. The system of claim 7, wherein the system is configured to de-quantize each quantized resource block for each symbol position front-hauled using the variable resolution quantization by doing the following:
determining a size of that quantized resource block;
de-quantize that quantized resource block assuming that quantized resource block was quantized using the high resolution if the size of that quantized resource block is associated with the high resolution; and de-quantize that quantized resource block assuming that quantized resource block was quantized using the low resolution if the size of that quantized resource block is associated with the low resolution.

10. The system of claim 7, wherein the variable resolution quantization is performed by at least one of:
the radio point to quantize and front-haul uplink front-haul data; and
at least one of the controllers to quantize and front-haul downlink front-haul data.

11. The system of claim 7, wherein the radio point comprises a multi-carrier radio point, wherein the multi-carrier radio point is configured to use the variable resolution quantization for uplink front-haul data sent from the multi-carrier radio point.

12. The system of claim 1, wherein the higher resolution comprises 8-bit resolution, and the lower resolution comprises 6-bit resolution.

13. The system of claim 1, wherein the front-haul network comprises a switched Ethernet front-haul network.

14. A method of using variable resolution compression to front-haul at least some data over a front-haul network in a system configured to provide wireless service to user equipment, the system comprising one or more controllers and a radio point to wirelessly transmit and receive radio frequency signals to and from the user equipment using one or more carriers and one or more air interfaces, the radio point associated with at least one antenna, wherein the radio point is communicatively coupled to the one or more controllers via a front-haul network and wherein each controller is configured to perform at least some processing for the system, the method comprising:
for each symbol position front-hauled over the front-haul network:
determining a respective number of required resource blocks having respective actual user-equipment signal data to front-haul for each carrier;
determining a number of high-resolution resource blocks that can be compressed at a higher resolution as a function of a difference between a nominal per-symbol-position front-haul link capacity and a link capacity needed to front-haul the required resource blocks for all of the carriers if compressed using a lower resolution;
allocating the high-resolution resource blocks to each carrier;
determining, for each carrier, which of the required resource blocks to compress at the higher resolution;
compressing each of the required resource blocks using either the higher resolution or the lower resolution depending on whether it was determined to compress that required resource block at the higher resolution or not; and
front-hauling the compressed required resource blocks over the front-haul network.

15. The method of claim 14, wherein, for each symbol position, allocating the high-resolution resource blocks to each carrier comprises doing the following:
sorting the carriers based on the respective number of required resource blocks determined for each carrier;
for each successive carrier as sorted:
determining an initial allocation for that carrier by dividing the unallocated portion of the high-resolution resource blocks by the number of carriers that have not been allocated the high-resolution resource blocks;
if the initial allocation is less than or equal to the respective number of required resource blocks determined for that carrier, allocating to that carrier a portion of the high-resolution resource blocks that is equal to the initial allocation; and
if the initial allocation is greater than the respective number of required resource blocks determined for that carrier, allocating to that carrier a portion of the high-resolution resource blocks that is equal to the respective number of required resource blocks determined for that carrier.

16. The method of claim 14, wherein said one or more controllers comprises multiple controllers, each of the multiple controllers using at least one of the one or more carriers; and
wherein the radio point is shared among the multiple controllers.

17. The method of claim 9, wherein the variable resolution compression comprises variable resolution quantization;
wherein, for each symbol position, determining the number of high-resolution resource blocks that can be compressed at the higher resolution comprises determining the number of high-resolution resource blocks that can be quantized at the higher resolution;
wherein, for each symbol position, determining, for each carrier, which of the required resource blocks to compress at the higher resolution comprises determining, for each carrier, which of the required resource blocks to quantize at the higher resolution;
wherein, for each symbol position, compressing each of the required resource blocks using either the higher resolution or the lower resolution comprises quantizing each of the required resource blocks using either the higher resolution or the lower resolution depending on whether it was determined to quantize that required resource block at the higher resolution or not; and
wherein, for each symbol position, front-hauling the compressed required resource blocks over the front-haul network comprises front-hauling the quantized required resource blocks over the front-haul network.

18. The method of claim 17, wherein, for each symbol position, determining, for each of the carriers, which of the required resource blocks to quantize at the higher resolution comprises doing at least one of the following:
(a) for each carrier:
selecting successive even-indexed required resource blocks for that carrier taken in ascending order and then odd-indexed required resource blocks for that carrier taken in ascending order until all of the high-resolution resource blocks allocated to that carrier have been selected; and
(b) for each carrier:
sorting the required resource blocks for that carrier in descending order of average power or allocated modulation and coding scheme (MCS); and
selecting successive sorted required resource blocks for that carrier to quantize at the higher resolution until all of the high-resolution resource blocks allocated to that carrier have been selected.

19. The method of claim 17, wherein the method further comprises de-quantizing each quantized resource block for each symbol position front-hauled using the variable resolution quantization by doing the following:

determining a size of that quantized resource block;
de-quantize that quantized resource block assuming that quantized resource block was quantized using the high resolution if the size of that quantized resource block is associated with the high resolution; and
de-quantize that quantized resource block assuming that quantized resource block was quantized using the low resolution if the size of that quantized resource block is associated with the low resolution.

20. The method of claim 17, wherein the method is performed by at least one of:
the radio point to quantize and front-haul uplink front-haul data; and
at least one of the controllers to quantize and front-haul downlink front-haul data.

21. The method of claim 17, wherein the radio point comprises a multi-carrier radio point, wherein the method is performed by the multi-carrier radio point to quantize uplink front-haul data sent from the multi-carrier radio point.

22. The method of claim 14, wherein the higher resolution comprises 8-bit resolution, and the lower resolution comprises 6-bit resolution.

23. The method of claim 14, wherein the front-haul network comprises a switched Ethernet front-haul network.

24. The method of claim 9, wherein each controller is configured to perform at least one of:
at least some Layer-3 processing for at least one of the air interfaces;
at least some Layer-2 processing for at least one of the air interfaces; and
at least some Layer-1 processing for at least one of the air interfaces.

25. A multi-carrier radio point for use in a system to provide wireless service to user equipment, the system comprising one or more controllers and the multi-carrier radio point, wherein each controller is configured to perform at least some processing for the system, the multi-carrier radio point comprising:
at least one interface to communicatively couple the multi-carrier radio point to a front-haul network used for front-hauling data between the controllers and the multi-carrier radio point;
at least one programmable device; and
at least one radio frequency module configured to wirelessly transmit and receive radio frequency signals to and from the user equipment using one or more carriers and one or more air interfaces;
wherein the at least one programmable device is configured to use variable resolution compression to front-haul at least some data over the front-haul network by doing the following, for each symbol position front-hauled over the front-haul network:
determine a respective number of required resource blocks having respective actual user-equipment signal data to front-haul for each carrier;
determine a number of high-resolution resource blocks that can be compressed at a higher resolution as a function of a difference between a nominal per-symbol-position front-haul link capacity and a link capacity needed to front-haul the required resource blocks for all of the carriers if compressed using a lower resolution;
allocate the high-resolution resource blocks to each carrier;
determine, for each carrier, which of the required resource blocks to compress at the higher resolution;
compress each of the required resource blocks using either the higher resolution or the lower resolution depending on whether it was determined to compress that required resource block at the higher resolution or not; and
front-haul the compressed required resource blocks over the front-haul network.

26. The multi-carrier radio point of claim 25, wherein the at least one programmable device is configured to, for each symbol position, allocate the high-resolution resource blocks to each carrier by doing the following:
sort the carriers based on the respective number of required resource blocks determined for each of the carriers;
for each successive carrier as sorted:
determine an initial allocation for that carrier by dividing the unallocated portion of the high-resolution resource blocks by the number of carriers that have not been allocated the high-resolution resource blocks;
if the initial allocation is less than or equal to the respective number of required resource blocks determined for that carrier, allocate to that carrier a portion of the high-resolution resource blocks that is equal to the initial allocation; and
if the initial allocation is greater than the respective number of required resource blocks determined for that carrier, allocate to that carrier a portion of the high-resolution resource blocks that is equal to the respective number of required resource blocks determined for that carrier.

27. The multi-carrier radio point of claim 25, wherein said one or more controllers comprises multiple controllers, each of the multiple controllers using at least one of the one or more carriers; and
wherein the multi-carrier radio point is shared among the multiple controllers.

28. The multi-carrier radio point of claim 25, wherein the at least one programmable device is configured to use variable resolution quantization as the variable resolution compression;
wherein the at least one programmable device is configured to, for each symbol position front-hauled over the front-haul network, determine the number of high-resolution resource blocks that can be compressed at the higher resolution by determining the number of high-resolution resource blocks that can be quantized at the higher resolution;
wherein the at least one programmable device is configured to, for each symbol position front-hauled over the front-haul network, determine, for each carrier, which of the required resource blocks to compress at the higher resolution by determining, for each carrier, which of the required resource blocks to quantize at the higher resolution;
wherein the at least one programmable device is configured to, for each symbol position front-hauled over the front-haul network, compress each of the required resource blocks using either the higher resolution or the lower resolution by quantizing each of the required resource blocks using either the higher resolution or the lower resolution depending on whether it was determined to quantize that required resource block at the higher resolution or not; and
wherein the at least one programmable device is configured to, for each symbol position front-hauled over the front-haul network, front-haul the compressed required resource blocks over the front-haul network by front-hauling the quantized required resource blocks over the front-haul network.

29. The multi-carrier radio point of claim 28, wherein the at least one programmable device is configured to, for each symbol position, determine, for each of the carriers, which of the required resource blocks to quantize at the higher resolution by doing at least one of the following:

(a) for each carrier:
   selecting successive even-indexed required resource blocks for that carrier taken in ascending order and then odd-indexed required resource blocks for that carrier taken in ascending order until all of the high-resolution resource blocks allocated to that carrier have been selected; and (b) for each carrier:
   sorting the required resource blocks for that carrier in descending order of average power or allocated modulation and coding scheme (MCS); and
   selecting successive sorted required resource blocks for that carrier to quantize at the higher resolution until all of the high-resolution resource blocks allocated to that carrier have been selected.

30. The multi-carrier radio point of claim 25, wherein the front-haul network comprises a switched Ethernet front-haul network; and
   wherein the at least one interface to communicatively couple the multi-carrier radio point to the front-haul network comprises at least Ethernet interface to couple the multi-carrier radio point to the switched Ethernet front-haul network.

\* \* \* \* \*